United States Patent [19]
Kurabayashi et al.

[11] Patent Number: 6,092,780
[45] Date of Patent: Jul. 25, 2000

[54] LOW-BED TYPE SEISMIC ISOLATOR FOR DISPLAY CASE

[75] Inventors: Hiroshi Kurabayashi, Tokyo; Nobuyuki Sone, Yamato; Akira Matsuda; Daisuke Yaguchi, both of Ichikawa; Toshio Omi, Sakura; Hidesi Ito, Ichihara; Tomoya Ishida, Tokyo; Kazuhiko Maebayashi, Tokyo; Keiji Hasegawa, Tokyo; Haruhisa Inoue, Kashiwa; Toshiyuki Imaki, Yokohama, all of Japan

[73] Assignees: Mitsubishi Steel Mfg. Co., Ltd.; Shimizu Corporation, both of Tokyo, Japan

[21] Appl. No.: 09/184,477

[22] Filed: Nov. 2, 1998

[30] Foreign Application Priority Data

Dec. 2, 1997 [JP] Japan .................................. 9-331725
Dec. 2, 1997 [JP] Japan .................................. 9-331726

[51] Int. Cl.[7] .................................................. F16M 13/00
[52] U.S. Cl. .......................... 248/636; 248/562; 248/638; 52/167.1; 52/167.5; 52/167.6
[58] Field of Search .................................. 248/636, 638, 248/562, 588, 421, 619; 52/167.1, 167.5, 167.6; 414/417; 180/312; 267/140.11

[56] References Cited

U.S. PATENT DOCUMENTS

| | | | |
|---|---|---|---|
| 4,596,373 | 6/1986 | Omi et al. ................................ | 248/562 |
| 4,662,133 | 5/1987 | Kondo ................................ | 248/636 X |
| 4,917,211 | 4/1990 | Yamada et al. ........................ | 52/167 X |
| 5,014,625 | 5/1991 | Murai et al. ............................. | 104/292 |
| 5,099,090 | 3/1992 | Allan et al. .............................. | 174/257 |
| 5,261,200 | 11/1993 | Sasaki et al. ........................ | 52/167 RS |
| 5,827,035 | 10/1998 | Fuke et al. ............................... | 414/417 |
| 5,913,503 | 6/1999 | Satoh et al. .............................. | 248/636 |
| 5,927,926 | 7/1999 | Yagi et al. ................................ | 414/280 |
| 5,934,029 | 8/1999 | Kawai et al. .......................... | 52/167.5 |

*Primary Examiner*—Ramon O. Ramirez
*Assistant Examiner*—Tan Le
*Attorney, Agent, or Firm*—Flynn, Thiel, Boutell & Tanis, P.C.

[57] ABSTRACT

A low-bed type seismic isolator for a display case, which includes: at least two lines of arcuate X-rails (3) fixed to a lower plate (1) on a foundation and having lower central portions and higher end portions; at least two lines of arcuate Y-rails (4) fixed to a lower surface of an upper plate (2) above the X-rails (3) and having higher central portions and lower end portions in a direction perpendicularly to the X-rails; connection blocks (5) having lower portions clamping the X-rails, upper portions clamping the Y-rails, and a disk spring provided at the central portions thereof; absorbers (8) disposed on the ends of the X-rails and Y-rails and recesses which fixedly accommodates support legs (7) fixed to the lower surface of the upper plate and protruded downwardly from a seismic isolation object. The seismic isolator does not substantially change the height of a seismic isolation object, and can be applied, for instance, to a display case of a museum, so as to provide the effective seismic isolation as well as to facilitate an inspection to a displayed exhibit The additional provision of casters makes it possible to readily move the seismic isolator to any arbitrary place.

4 Claims, 9 Drawing Sheets

LOW-BED TYPE SEISMIC ISOLATOR FOR DISPLAY CASE

BACKGROUND OF THE INVENTION

1. Field of the Invention

The present invention relates to a low-bed type seismic isolator, which protects a seismic isolation object, such as an exhibit in a museum or the like, from an earthquake. Throughout the specification, the term "a seismic isolation object" is used to mean an object requiring a seismic isolator for protection from an earthquake.

2. Description of the Related Art

A conventional seismic isolator is constructed by X-rails 3 fixed to a lower plate 1 fixed to a foundation, Y-rails 4 which are fixed to the lower surface of an upper plate 2 above the X-rails 3 and which are disposed perpendicularly to the X-rails 3, and connection blocks 5 connecting the X-rails 3 and the Y-rails 4 together, as shown in FIG. 11. Although not shown in the drawing, a spring for restoration is required between the seismic isolator and the foundation. The connection block is arranged for movement such that a ball bearing is disposed on its lower portion to clamp the X-rail, whereas another ball bearing is disposed on its upper portion to clamp the Y-rail, and further a universal joint is provided at its central portion. A seismic isolation object 10 is placed on the seismic isolator, so that the height thereof is increased by an amount corresponding to the height of the seismic isolator. Therefore, if the seismic isolation object is a display case in a museum or the like, there may arise that a visitor whose eye-level is low in height, can not horizontally view an exhibit within the display case. Further, it is preferable to set the display case as low as possible from an aesthetic view point.

SUMMARY OF THE INVENTION

In view of the above, the present invention has been made, and therefore has an object of the invention to manufacture a novel seismic isolator for a seismic isolation object as well as to provide a low-bed type seismic isolator for a display case which can be installed without the substantial change in height even if it is applied to a conventional seismic isolation object. Further, the present invention makes the above-mentioned seismic isolators movable.

In order to solve the above-mentioned problems, the present invention provides a low-bed type seismic isolator for a display case, which includes: at least two lines of arcuate X-rails fixed to a lower plate on a foundation, each of said X-rails having a lower central portion and higher end portions; at least two lines of arcuate Y-rails fixed to a lower surface of an upper plate above said X-rails, each of said Y-rails having a higher central portion and lower end portions in a direction perpendicular to said X-rails; connection blocks, each having a lower portion clamping a corresponding X-rail, an upper portion clamping a corresponding Y-rail, and a disk spring provided at the central portion thereof; absorbers disposed on the ends of said X-rails and Y-rails, respectively; and recesses, provided in said upper plate, for fixedly accommodating support legs fixed to a lower surface of a seismic isolation object and protruded downwardly from the seismic isolation object. The present invention also provides a low-bed type seismic isolator for a display case in which a carrier is provided on the ends of the above-mentioned upper and lower plates.

The upper plate preferably has a plurality of through holes.

The provision of a friction damper at central portions of said upper and lower plates allows the seismic isolator to possess a characteristic which can not be obtained from an oil damper or other dampers. For instance, the seismic isolator can be made compact and capable of surely damping even when there is a large displacement.

Although at least two lines of X-rails and at least two lines of Y-rails are provided in parallel, each line may be constructed by one arcuate rail, or alternatively may be constructed by two arcuate rails arranged in series. In the case of constituting one line by one arcuate rail, the absorbers are provided at both ends of each arcuate rail, whereas in the case of constituting one line by the two arcuate rails arranged in series, the absorber may be provided only at the joint portion between these two arcuate rails. When the vibration occurs, the connection block is moved along the arcuate rail, and if the vibration is large, then the connection block collides against the absorber to absorb the shock. Since the arcuate rail provides the restoration effect, a conventional restoration spring can be dispensed with.

The connection block controls vertical displacement and makes a linear motion while maintaining being horizontal since the lower portion having a ball-bearing clamps the X-rail, the upper portion having a ball-bearing clamps the Y-rail, and a disk spring is provided at the central portion. The provision of the friction dampers at the central portions of the lower and upper plates further enhances the attenuation of the vibration.

The recess provided in the upper plate fixedly accommodates a support leg fixed to and protruded downwardly from the lower surface of the seismic isolation object, and thus the height of the seismic isolation object can be lowered by an amount correspondingly to the depth of the recess.

DETAILED DESCRIPTION OF THE PREFERRED EMBODIMENT

An embodiment of the present invention will now be described with reference to the drawings.

Figure 1:
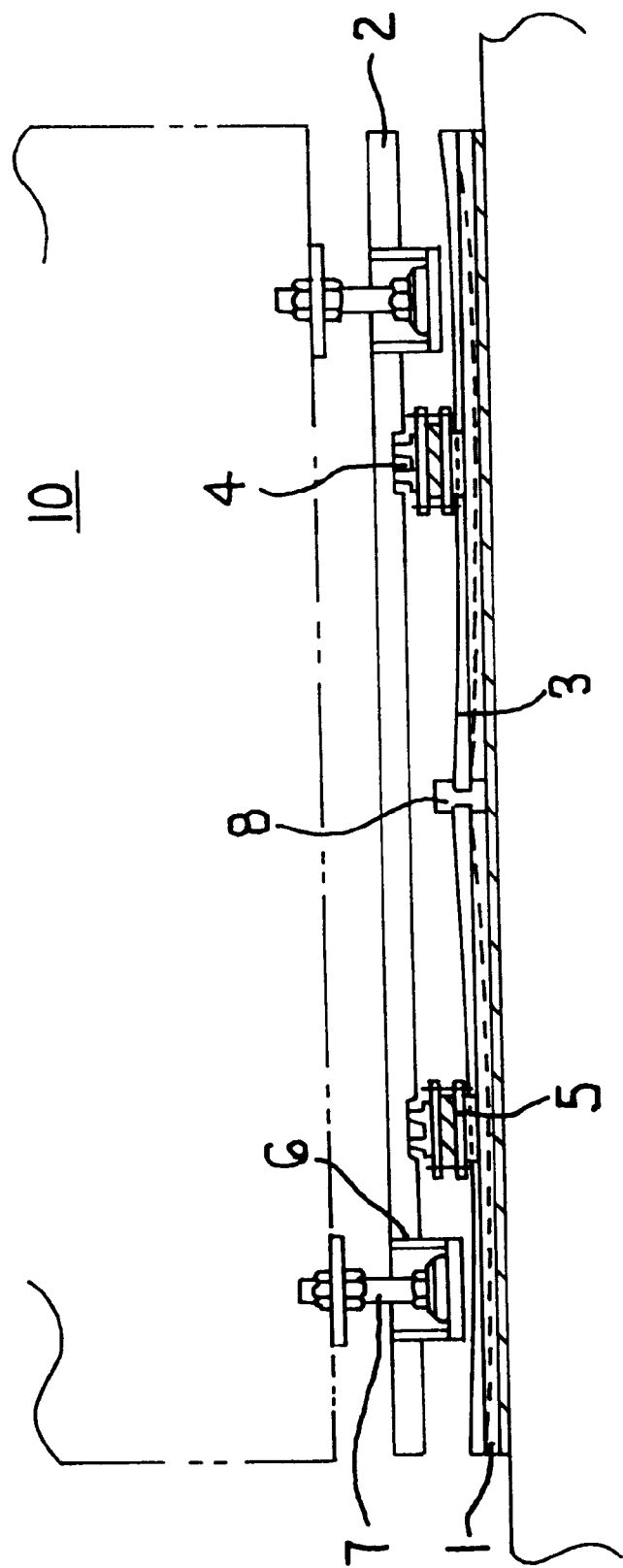
FIG. 1 is a frontal view of an X-rail side of the present invention.

FIG. 1 is a frontal view of a seismic isolator showing a relative position in a normal condition. Lower portions of connection blocks 5 are respectively engaged with two arcuate X-rails 3, which are fixed in series to a lower plate 1. An absorber 8 is provided at a joint between the arcuate X-rails 3. Y-rails 4 are provided on a lower surface of an upper plate 2 so as to be perpendicular to the X-rails 3. Upper portions of the connection blocks 5 are engaged with the Y-rails 4, respectively. Reference numeral 6 denotes a recess provided in the upper plate 2, which fixedly accommodates a support leg 7 fixed to and protruded downwardly from a lower surface of a seismic isolation object 10. This reduces the set height of the seismic isolation object 10. A commonly known friction damper 9 is independently provided at the central portion of the seismic isolator (see FIG. 6).

Figure 2:
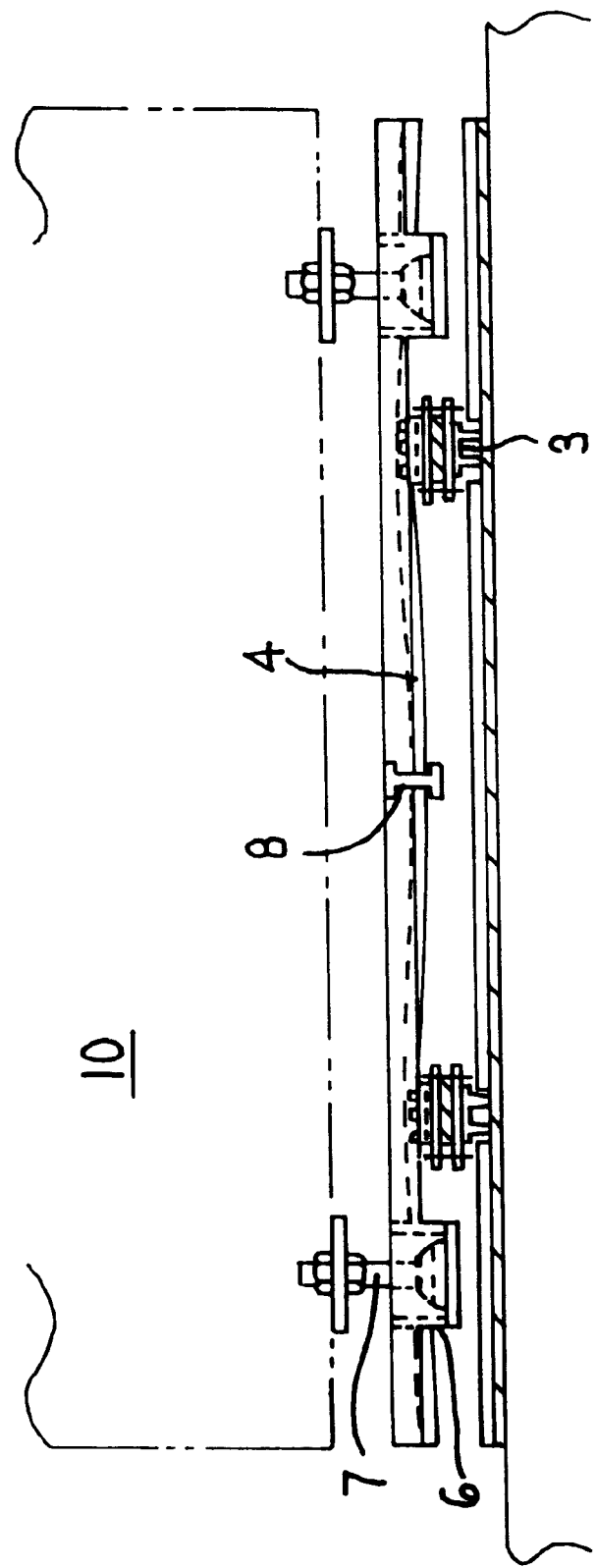
FIG. 2 is a side view of the present invention.

FIG. 2 is a side view of the seismic isolator shown in FIG. 1. The upper portions of the connection blocks 5 are respectively engaged with the two arcuate Y-rails 4 fixed to the lower surface of the upper plate 2. An absorber 8 is provided at the joint between the Y-rails.

Figure 3:
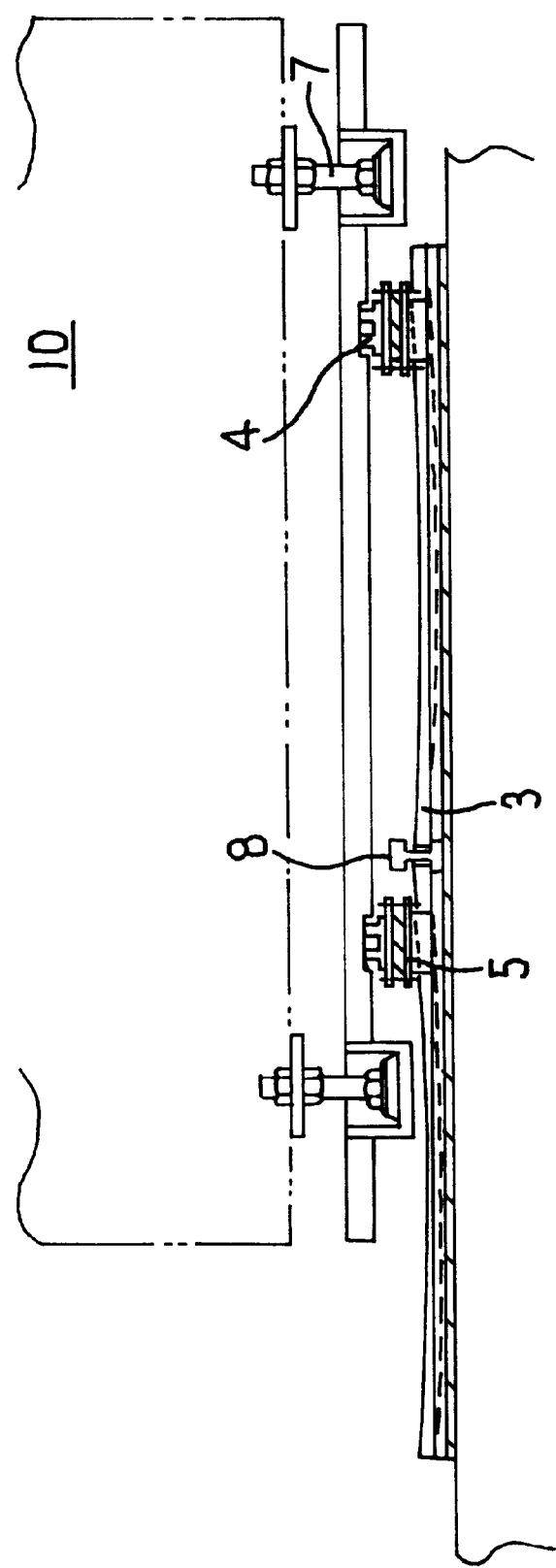
FIG. 3 shows a state where a seismic isolator shown in FIG. 1 is moved in the right-handed direction due to the vibration.

FIG. 3 shows a relative position in the case where the seismic isolation object 10 shown in FIG. 1 is moved in the right-handed direction due to vibration. The connection blocks 5,5 on both sides are repeatedly moved along the X-rails 3 in the right-handed direction, stopped at the ends of the X-rails and then returned in the left-handed direction toward the centers of the X-rails 3, and again moved in the right-handed direction . . . In the case of the large vibration, the left-handed side connection block 5 abuts against the absorber 8 so that the collision shock can be absorbed. Of course, there are some cases that the right-handed side connection block 5 is moved in the left-handed direction to abut against the absorber 8, thereby absorbing the shock. This can provide effective seismic-isolation function in cooperation with the damping effect of the commonly known friction damper 9 (see FIG. 6) set at the central portion of this seismic isolator.

Figure 4:
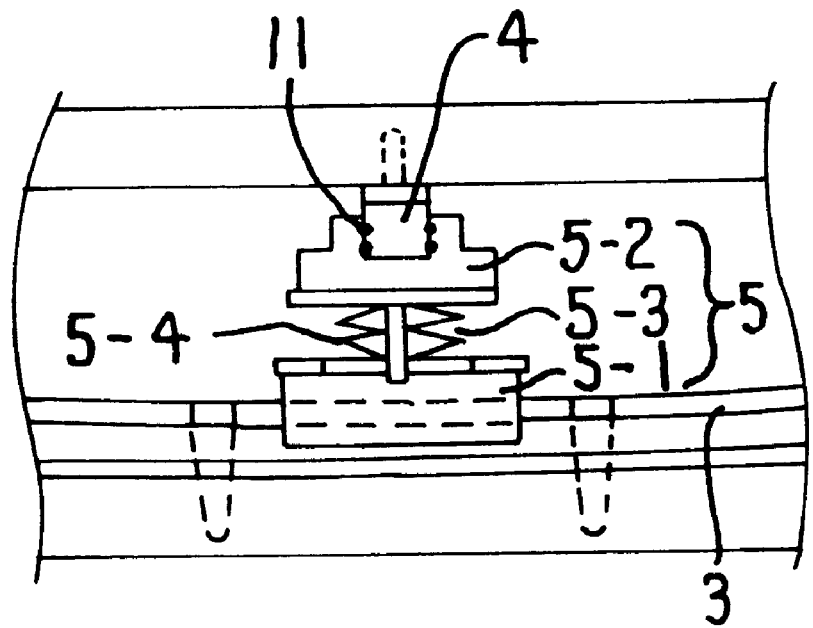
FIG. 4 is an enlarged explanatory view for a connection block.

FIG. 4 is an enlarged view showing the connection block 5. The connection block 5 is provided between the X-rail 3 and the Y-rail 4. A lower clamp portion 5-1 clamps the X-rail 3 through a ball bearing 11, whereas an upper clamp portion 5-2 clamps the Y-rail 4 through a ball bearing 11. A central shaft 5-4, fixed to the lower surface of the upper clamp portion 5-2, passes through centers of four disk springs 5-3 which are arranged in series and interposed between the clamp portions 5-1 and 5-2.

Figure 5:
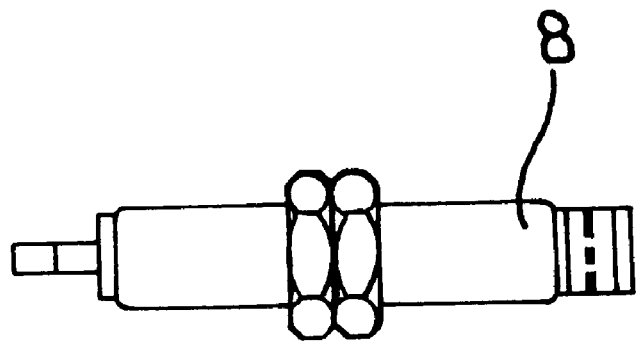
FIG. 5 is an enlarged explanatory view for an absorber.

FIG. 5 shows an example of the absorber 8. This absorber 8 is fixed to each joint portion between X-rails 3 (or Y-rails 4) in the case of constituting the line of X-rails (or Y-rails) by two arcuate rails arranged in series. Alternatively, in the case of arranging the lines of X-rail 3 (or Y-rail 4), each constituted by a single arcuate rail, in parallel, the absorbers 8 are horizontally fixed to the ends of each arcuate rail. When the seismic isolation object 10 is vibrated, the connection block 5 collides against the absorber 8 to absorb the shock.

Figure 6A:
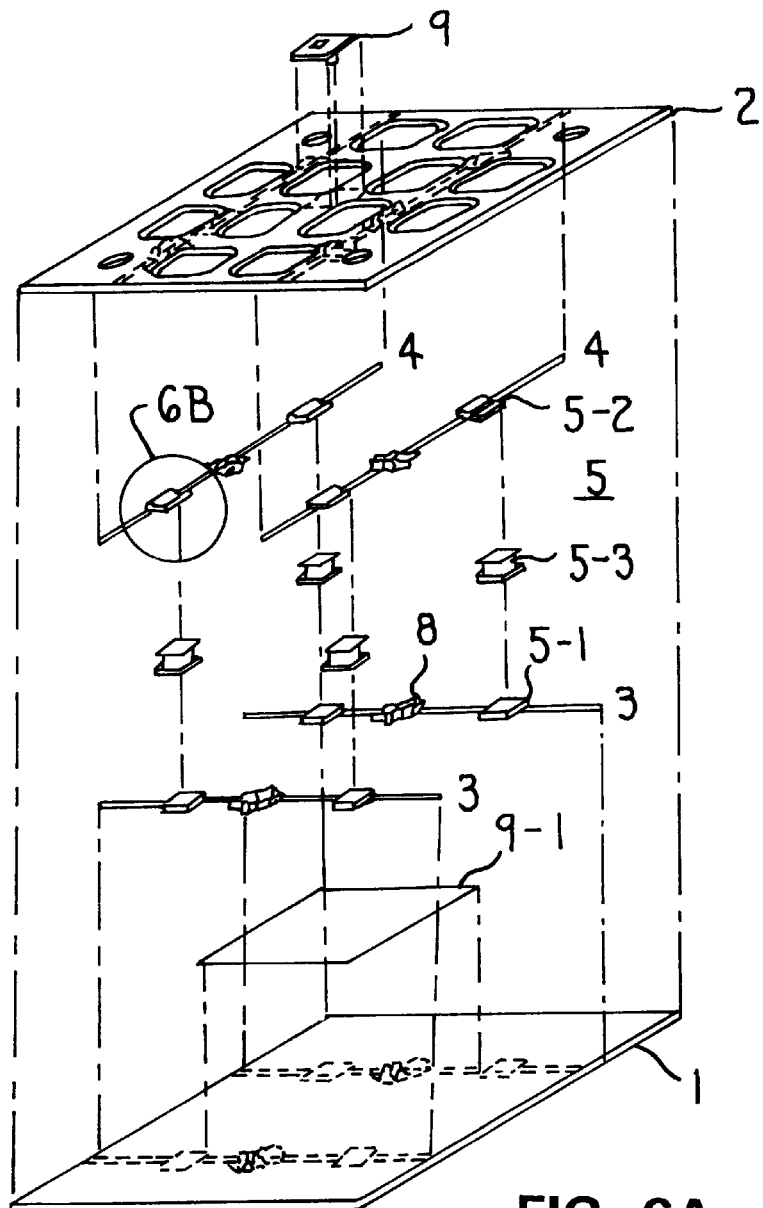
FIG. 6A is an exploded view showing components in the seismic isolator of the present invention.
Figure 6B:
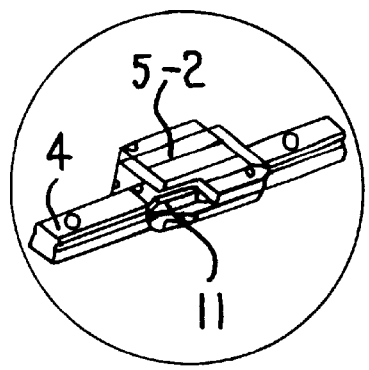
FIG. 6B is an enlarged view of the upper clamp portion and Y-rail of FIG. 6A.

FIGS. 6A and 6B three-dimensionally shows the above-described embodiment in such a manner that component parts are disassembled. In FIG. 6A, two lines of X-rails 3 and two line of Y-rails 4 are respectively arranged parallel in which each X- or Y rail line is constituted by two arcuate rails arranged in series and the absorber 8 is fixed to each joint portion between the arcuate rails. The upper plate 2 is formed with a plurality of rectangular (square, triangular or the like) through holes for light-weight purpose as far as the upper plate 2 bears against the load of the seismic isolation object.

Figure 7:
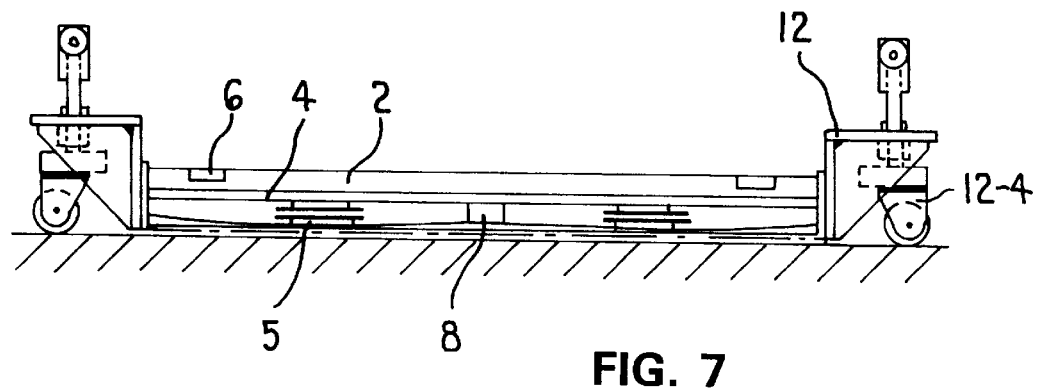
FIG. 7 is a side view showing a seismic isolator of the present invention to which a carrier is fixed.

FIG. 7 shows a low-bed type seismic isolator for a display case in which a carrier 12 is provided on the low-bed type seismic isolator for a display case equivalent to that shown in FIG. 1. That is, the seismic isolator for the display case, including two arcuate Y-rails 4 fixed in series to the lower surface of the upper plate 2, two connection blocks 5 disposed downwardly therefrom, an absorber 8 at the center, and carriers 12 equipped with casters 12-4 and fixedly attached to both ends of the upper plate 2 and the lower plate, is shown in a side view. The carrier 12 is disposed at each of four-corners of this seismic isolator. In the drawing, reference numeral 6 designates a recess into which a support leg of the display case is inserted and fitted, similarly to that shown in FIG. 1.

Figure 8:
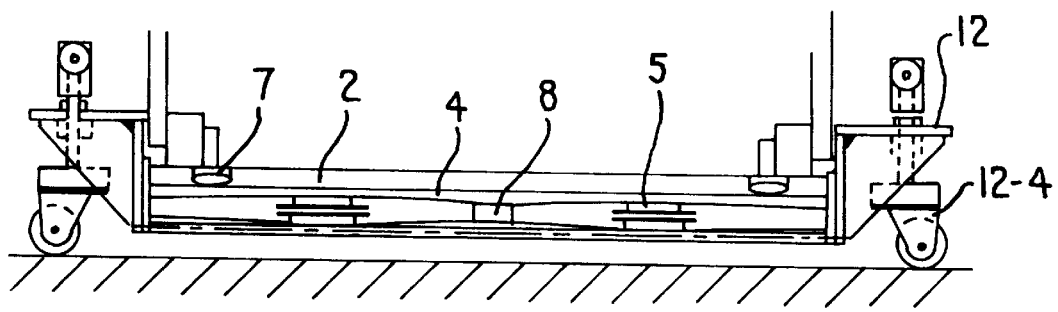
FIG. 8 is a side view showing a state where the seismic isolator of the present invention shown in FIG. 7, is elevated upwardly.

FIG. 8 is a side view showing a state where the seismic isolator for the display case shown in FIG. 7 is elevated for the purpose of moving the seismic isolator. In the drawing, reference numeral 7 designates the support leg of the display case.

Figure 9:
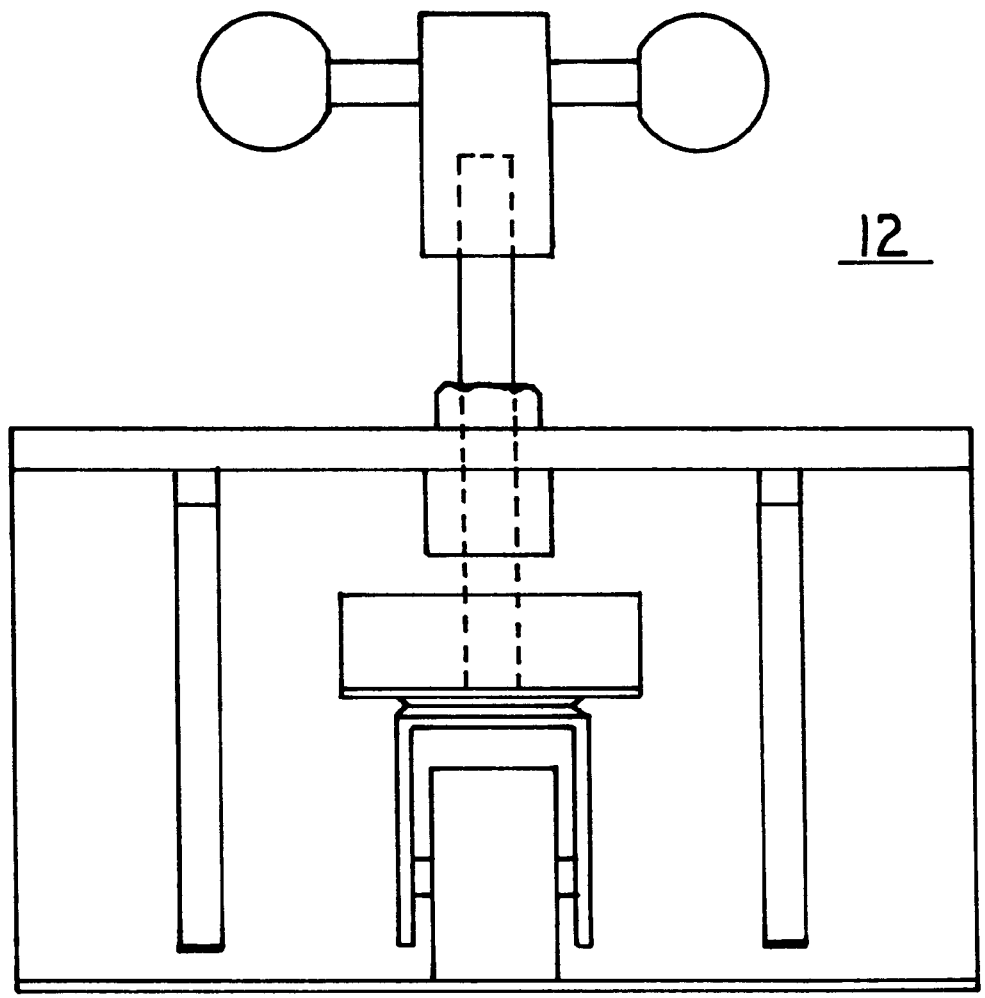
FIG. 9 is an enlarged frontal view showing a carrier to be fixed to the seismic isolator of the present invention.

FIG. 9 is an enlarged frontal view showing the carrier 12.

Figure 10:
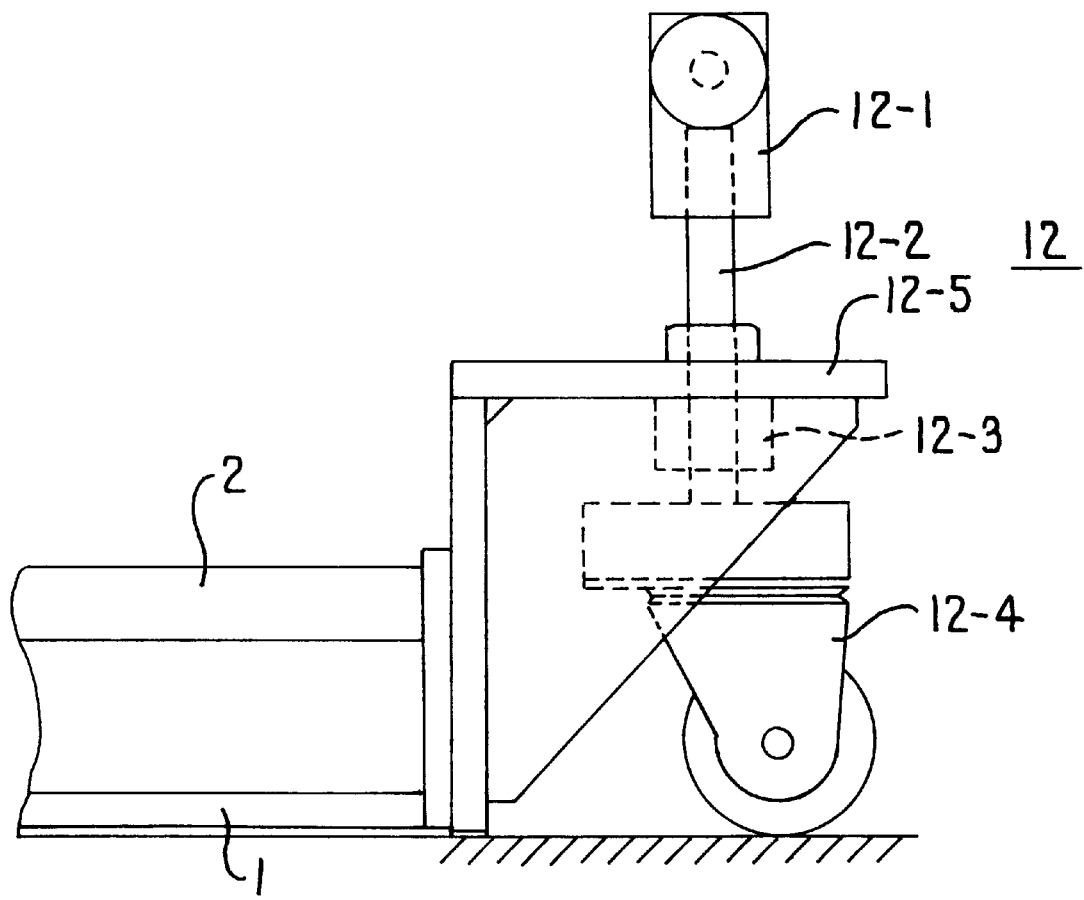
FIG. 10 is a side view of FIG. 9.
Figure 11:
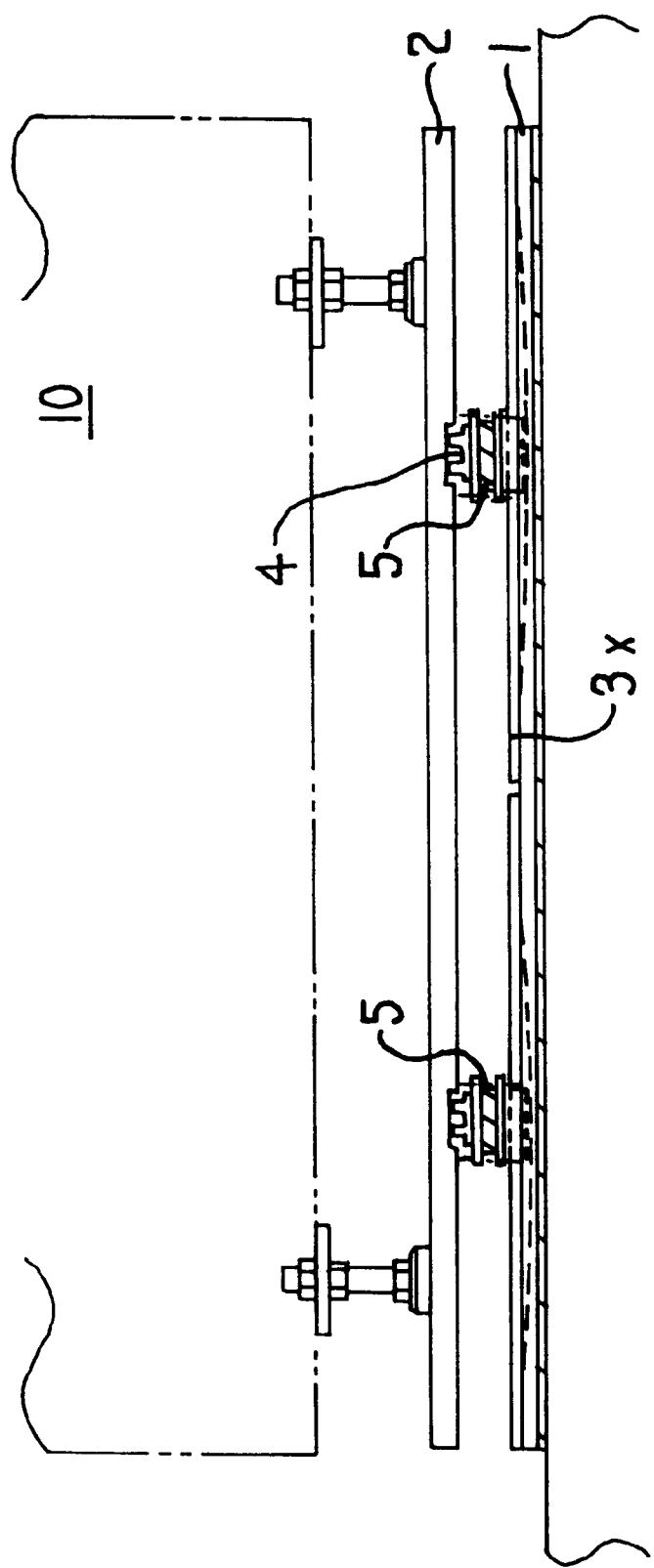
FIG. 11 is a frontal view showing a conventional seismic isolator.

FIG. 10 is a side view of FIG. 9. A mounting box 12-5, which is open at a front surface and triangular in a longitudinal section, is fixedly attached to the ends of the lower plate 1 and the upper plate 2. In the inside of the mounting box 12-5, a bolt 12-2, which is fixed to and projected downwardly from a knob portion 12-1, is passed through an upper plate of the mounting box 12-5 and a nut 12-3 provided on the inner surface thereof, so that the caster 12-4 is fixedly attached to the distal end of the bolt 12-2. By rotating the knob portion 12-1, the seismic isolator of the present invention can be elevated or descended through the bolt 12-2, the nut 12-3 and the S mounting box 12-5.

The seismic isolator of the present invention can conduct the effective seismic-isolation against small to large vibrations with a stationary display case of a museum or the like placed thereon by the effects of the arcuate rails, absorbers and a friction damper with respect to the vibrations in X- and Y-directions and by the controls of the disk springs of the connection blocks with respect to the vertical displacements. Further, the provision of the caster makes it possible to move the seismic isolator to another place.

The present invention can be applied to either of a new display case and a conventional display case, particularly as a seismic isolator for a display case of a museum or the like. The seismic isolation object can be maintained horizontally by the restoration effect of the arcuate rails and by the vertical displacement control of the disk springs of the connection blocks. Thus, the effective seismic-isolation can be obtained. The seismic isolator can be incorporated without the substantial change in height of the display case. Further, the provision of a plurality of through holes through the upper plate makes the seismic isolator light in weight. Furthermore, the friction damper can be disposed at the central portions of the upper and lower plates to provide the secure and compact seismic isolator. Moreover, the additional provision of the casters makes it possible to move the seismic isolator to any arbitrary place.

What is claimed is:

1. A low-bed type seismic isolator for a display case, said seismic isolator comprising:

at least two lines of arcuate X-rails fixed to a lower plate on a foundation, each of said X-rails having a lower central portion and higher end portions;

at least two lines of arcuate Y-rails fixed to a lower surface of an upper plate above said X-rails, each of said Y-rails having a higher central portion and lower end portions in a direction perpendicular to said X-rails;

connection blocks, each having a lower portion clamping a corresponding X-rail through a ball bearing, an upper portion clamping a corresponding Y-rail through a ball bearing, and a disk spring provided at the central portion thereof;

absorbers disposed on the ends of said X-rails and Y-rails, respectively; and recesses, provided in said upper plate, for fixedly accommodating support legs fixed to a lower surface of a seismic isolation object and protruded downwardly from the seismic isolation object.

2. A low-bed type seismic isolator for a display case as claimed in claim 1, wherein a carrier is provided on the ends of the upper and lower plates.

3. A low-bed type seismic isolator for a display case as claimed in claim 1, wherein the upper plate has a plurality of through holes.

4. A low-bed type seismic isolator for a display case as claimed in claim 1, wherein a friction damper is disposed at central portions of the upper and lower plates.

* * * * *